(12) United States Patent
McKean et al.

(10) Patent No.: US 6,647,387 B1
(45) Date of Patent: Nov. 11, 2003

(54) SYSTEM, APPARATUS, AND METHOD FOR ENHANCING STORAGE MANAGEMENT IN A STORAGE AREA NETWORK

(75) Inventors: Brian D. McKean, Longmont, CO (US); John E. Archibald, Jr., Boulder, CO (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/559,200

(22) Filed: Apr. 27, 2000

(51) Int. Cl.$^7$ .......................... G06F 17/30; G06F 15/16
(52) U.S. Cl. ............... 707/9; 707/10; 707/102; 707/103 R; 707/104.1; 709/229
(58) Field of Search .................... 707/10, 103 R, 707/104.1, 2, 5, 1, 9, 102, 100; 709/229

(56) References Cited

U.S. PATENT DOCUMENTS 6,029,168 A * 2/2000 Frey ........................... 707/10
6,343,324 B1 * 1/2002 Hubis et al. ................. 709/229

* cited by examiner

Primary Examiner—Frantz Coby
(74) Attorney, Agent, or Firm—Dorsey & Whitney LLP (57) ABSTRACT

The invention provides a system, apparatus and procedure whereby a controller manages computer access to a number of storage volumes in a storage peripheral. To accomplish this, a system administrator assigns a plurality of port IDs to a disk array controller, the disk array controller being responsive to requests from a computer using any of the plurality of port IDs. Next, the system administrator configures a data structure in a memory of the controller such that at least a subset of the plurality of port IDs are mapped to particular ones of the number of storage volumes. Next, in response to an access request by a computer, wherein the access request specifies a target port ID, the controller grants the computer access to only those storage volumes whose mapped port ID corresponds to the target ID.

28 Claims, 7 Drawing Sheets

FC SWITCH
PORT ID/HOST MAPPING TABLE
126

|  | PORT IDENTIFIER 128 (COL. 0) | HOST COMPUTERS WITH ACCESS RIGHTS 130 (COL. 1) |
|---|---|---|
| ROW 0 | 0 | 102-1, 102-2 |
| ROW 1 | 1 | 102-3 |
| ROW 2 | 2 | 102-10 |
| ROW 3 | 3 | 102-1, 102-6 |
| ROW 4 | 4 | ALL COMPUTERS |
| ROW 5 | 5 | NONE |

| | PORT IDENTIFIER 128 (COL. 0) | LOGICAL UNIT NUMBERS (LUNS) 143 (COL. 1) |
|---|---|---|
| ROW 0 | 0 | 116-A1, 116-A2, 116-A3 |
| ROW 1 | 1 | 116-A3 |
| ROW 2 | 2 | 116-A115 |
| ROW 3 | 3 | 116-A4 TO 116-A10 |
| ROW 4 | 4 | 116-A15 TO 116-A25 |
| ROW 5 | 5 | 116-A26 TO 116-A100 |

DISK ARRAY CONTROLLER PORT ID/LU MAPPING TABLE 142

SYSTEM, APPARATUS, AND METHOD FOR ENHANCING STORAGE MANAGEMENT IN A STORAGE AREA NETWORK

FIELD OF THE INVENTION

The present invention pertains generally to computer systems and networks having two or more host computers and at least one shared data storage device. More particularly, the invention pertains to a system, structure and procedure for controlling access to shared storage in computer systems and networks having a plurality of host computers that may create data integrity issues for the shared data storage, particularly in a Storage Area Network (SAN).

BACKGROUND OF THE INVENTION

It is known in the prior art to to provide some degree of host computer data storage access management in a SAN (SAN management) within devices in a fabric, as disclosed in co-pending application Ser. No. 09/394,220 filed on Sep. 13, 1999, which is hereby incorporated by reference. However, such prior art SAN management techniques are problematic because they require at least a subset of the disk array controllers in a SAN to perform complex and time consuming techniques to provide such management.

SANs typically include many host computers (computers) and storage peripherals, wherein each storage peripheral is managed by a respective disk array controller. There may be hundreds of storage volumes, or logical units within each storage peripheral. To manage computer access to storage volumes in a storage peripheral, a disk array controller typically maintains a map that identifies each respective computer's access privileges to each logical unit in the disk array controller's corresponding storage peripheral. Every time that a computer is added or removed from the SAN, each disk array controller to which the computer is connected is required to modify its mapping to respectively either add or remove the computer and its associated LU access to/from the map. Desirably, such complex map maintenance in a disk array controller would be reduced, thereby enabling each disk array controller in a SAN to maintain reasonable data throughput.

Although prior art systems provide a Fibre Channel (FC) switch to manage computer access to disk array controllers, such prior art systems do not provide a solution to the problem described above. This is because prior art FC switch management does not manage a computer's access to respective logical units (LUs) within a storage peripheral, but rather only typically manages a computer's access to a storage peripheral. This means that a disk array controller must still typically perform the complex management procedures discussed above.

What is needed is a system and method to enhance SAN storage management by offloading the substantial amount of the processing that is generally required of a disk array controller to manage computer access to logical units within its respective storage peripheral.

SUMMARY OF THE INVENTION

One aspect of the present invention provides a procedure whereby a controller manages computer access to a number of storage volumes in a storage peripheral. To accomplish this, a system administrator assigns a plurality of port IDs to a disk array controller, the disk array controller being responsive to requests from a computer using any of the plurality of port IDs. Next, the system administrator configures a data structure in a memory of the controller such that at least a subset of the plurality of port IDs are mapped to particular ones of the number of storage volumes. Next, in response to an access request by a computer, wherein the access request specifies a target port ID, the controller grants the computer access to only those storage volumes whose mapped port ID corresponds to the target ID.

Another aspect of the invention is a storage area network that includes a plurality of computers connected to a disk array controller that is in turn connected to a number of storage volumes that are shared by the plurality of computers. Each of the plurality of computers having a respective locally assigned port ID of a plurality of port IDs. The controller including a data structure defined in a memory that includes a port ID to storage volume mapping table that maps at least a subset of the plurality of port IDs to particular ones of plurality of storage volumes. The mapping table being used by the controller to grant a computer of the plurality of computers access to particular ones of the plurality of storage volumes based on the computer's local port ID.

In yet another aspect, a controller includes a port that is responsive to a plurality of port IDs. The controller also includes a memory, wherein is stored a port ID to storage volume mapping table. The mapping table associating particular ones of the plurality of port IDs to respective storage volumes of a plurality of storage volumes. The mapping table being used by the controller to grant a computer access to particular ones of the plurality of storage volumes in response to receiving an I/O request from the computer that includes a locally assigned port ID. The access being based on the particular ones of the plurality of storage volumes that are mapped to a respective port ID of the particular ones of the plurality of ports IDs that is associated with the computer's local port ID.

DETAILED DESCRIPTION OF EMBODIMENTS OF THE INVENTION

The present invention provides a system, apparatus and method that enhances SAN storage management by offloading a substantial amount of the processing that is generally required of prior art disk array controllers. The invention accomplishes this is by advantageously enhancing FC switch SAN management capabilities to partition computer access at the LU level, as compared to the prior art where such FC switch management is only partitioned at the storage peripheral level.

To accomplish this, the invention associates multiple fibre channel identifiers, or port IDs to each port of a disk array controller (disk array controllers controls host computer access to a storage peripheral). In SCSI terminology, this means that the invention maps multiple SCSI target IDs to a single port of a disk array controller. The ports of the invention have the ability to respond to multiple port IDs. Next, the invention maps one or more logical units to each respective port ID. Finally, the invention maps those host computers that have access to the LUs that were mapped to a specific port ID, to the specific port ID.

The invention can be advantageously implemented in a fabric device, for example, a FC switch by combining the invention with the prior art FC switch mapping of which computers have access to which storage peripherals, thereby providing a finer granularity of SAN management at the FC switch than the prior art FC switches. Advantageously, the invention does not require an FC switch to have enhanced processing capabilities to manage host computer access to LUs. Furthermore, Because the invention offloads some degree of prior art SAN management functionality from disk array controllers, disk array controllers that are modified or implemented according to the teaching of the invention do not require enhanced processing capabilities to provide effective SAN management functionality. These and other benefits of the present invention will be discussed in the following detailed description, which describes aspects of an exemplary system, apparatus, and procedure of the invention.

Figure 1:
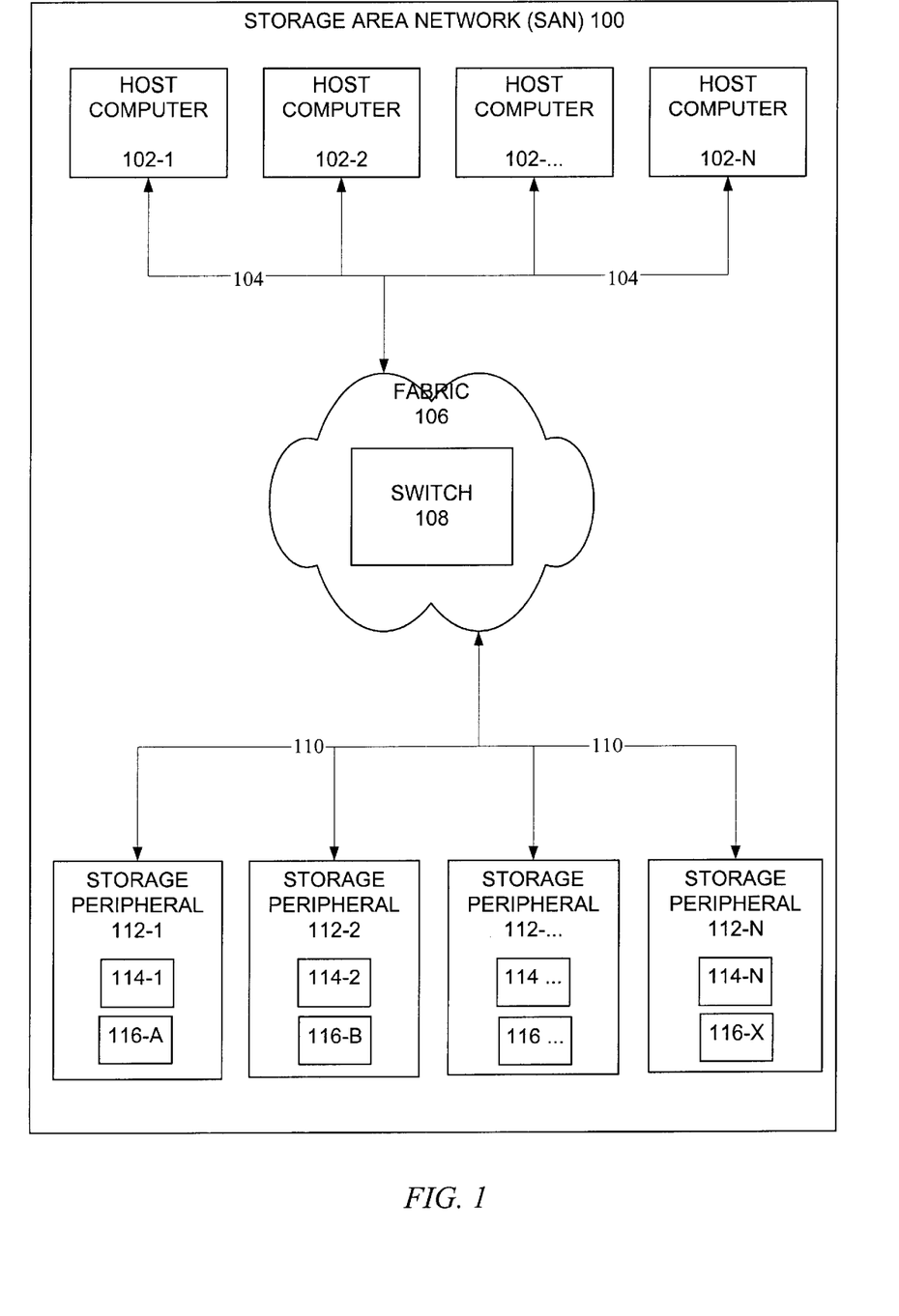
FIG. 1 is a block diagram that illustrates aspects of an exemplary storage area network (SAN), according to one embodiment of the present invention.

Referring to FIG. 1, there is shown a block diagram that illustrates aspects of an exemplary SAN 100, according to one embodiment of the present invention. In a preferred embodiment, SAN 100 is designed as a switched-access-network, wherein one of more FC switches 108 are used to create FC switching fabric 106. In one embodiment, SAN 100 is implemented using Small Computer Systems Interface (SCSI) protocol running over a Fibre Channel (FC) physical layer.

Host computers 102 are connected across I/O interface 104 to fabric 106. I/O interface 104 can be any type of I/O interface, for example a FC loop or a direct fabric 106 attachment, as long as the I/O interface 104 has a set of signal lines used by host computers 102 to transfer information respectfully to and from fabric 106. Fabric 106 includes, for example, one or more FC switches 108 used to connect two or more computer networks. FC switch 108. In one embodiment, FC switch 108 is a conventional router switch. FC switch 108 in combination with novel SAN management functionality in disk array controllers 114 provide enhanced SAN management to SAN 100. Aspects of such enhanced SAN management functionality is described in greater detail below in reference to FIGS. 2–7.

Switch 108 interconnects host computers 102 to storage peripherals 112 across I/O interface 110. I/O interface 110 can be any type of I/O interface, for example, a FC interface or a SCSI I/O interface, as long as the I/O interface 110 has a set of signal lines used by FC switch 108 to transfer information respectfully to and from storage peripherals 14. As far as devices in each respective network are concerned, for example, host computers 102 and storage peripherals 14, fabric 106 is transparent and represents a black box, wherein the devices do not interact directly with fabric devices, for example, FC switch 108, in fabric 106. Peripherals 112 are logical data storage devices that include, for example, respective disk array controllers 114 (controllers 114) and one or more logical units 116.

For example, peripheral 112-1 includes disk array controller 114-1, and any number of logical units 116-A. In yet another example, peripheral 112-2 includes disk array controller 114-2, and any number of logical units 116-B.

Figure 2:
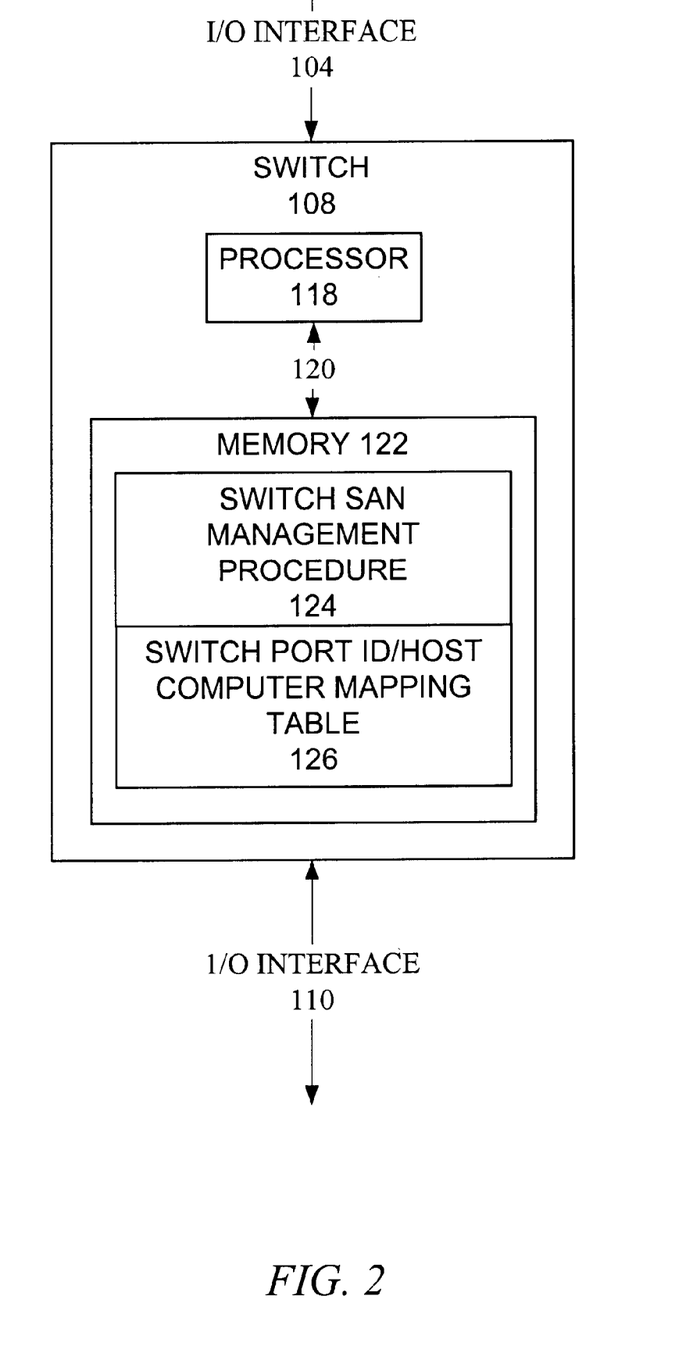
FIG. 2 is a block diagram that illustrates aspects of an exemplary fibre channel switch, according to one embodiment of the present invention.

Referring to FIG. 2, there is shown a block diagram that illustrates aspects of an exemplary switch 108, according to one embodiment of the present invention. Switch 108 includes processor 118 which is connected across local I/O interface 120 to memory 122. Local I/O interface 120 can be any type of I/O interface, for example, a peripheral component interconnect (PCI) 11O interface, as long as the local I/O interface 120 has a set of signal lines that can be used by processor 118 to transfer information respectfully to and from memory 122.

Memory 122 includes any combination of storage that is internal or external to processor 118 that is addressable by processor 118. For example, memory 122 can be cache memory, random access memory (RAM), non-volatile RAM, or external virtual memory on a data storage device, for example, in a storage peripheral 112 (see FIG. 1), where virtual addresses are mapped by processor 118 into real addresses. Processor 118 fetches and executes computer program instructions and data from memory 122 to control host computer 102 (see FIG. 1) access to logical units 116 (see FIG. 1). Such computer program instructions and data respectively include, for example, switch SAN management procedure 124 and FC switch port/ID mapping table 126.

Switch SAN management procedure 124 creates and maintains FC switch port/ID mapping table 126 to manage access by host computers 102 to storage peripherals 112, and in particular to disk array controllers 114 that control computer 102 access to their respective logical units 116. To better understand aspects of an exemplary procedure of switch SAN management procedure 124, we first describe FC switch port/ID mapping table 126.

Figure 3:
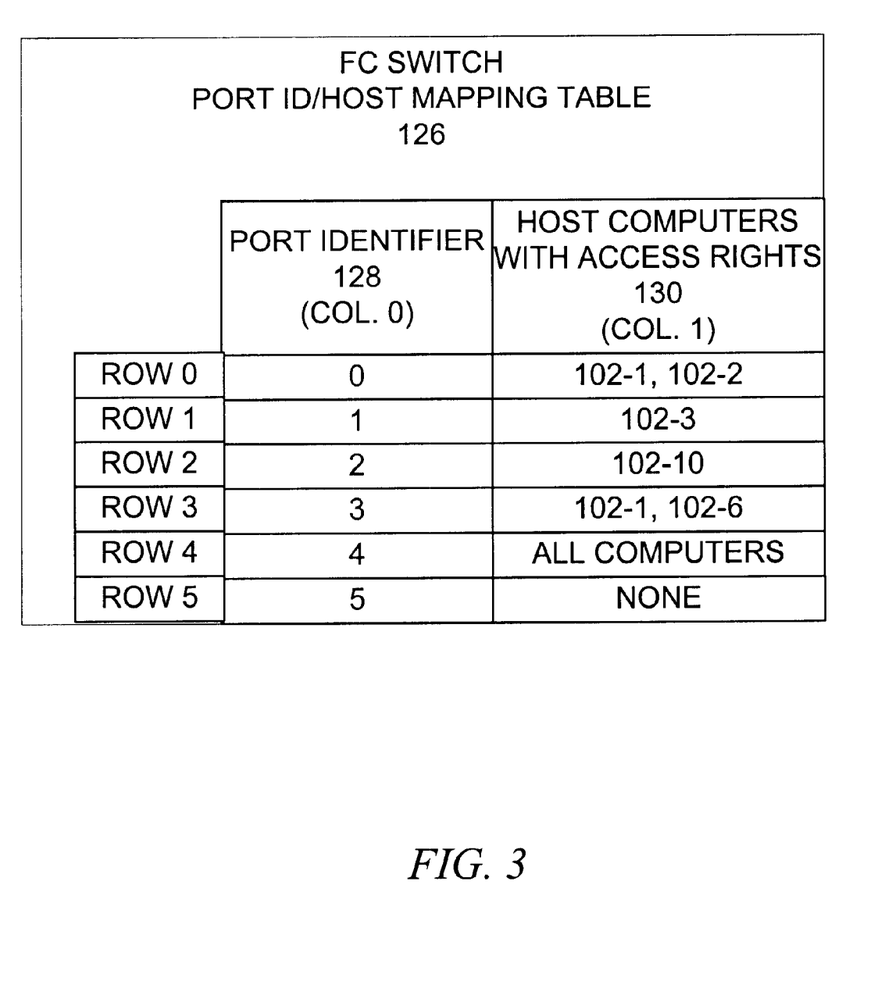
FIG. 3 is a block diagram that illustrates aspects of an exemplary fibre channel switch port ID/host computer mapping table, according to one embodiment of the present invention.

Referring to FIG. 3, there is a block diagram that illustrates aspects of an exemplary FC switch port ID/host computer mapping table 126 (table 126), according to one embodiment of the present invention. Switch SAN management procedure 124 maintains table 126 which maps a set of predetermined ports in a disk array controller 114 (see FIGS. 1 and 2) that are available to a set of predetermined host computers 102 (see FIG. 1). Using table 126, Switch SAN management procedure 124 will only allow host computer 102 access to a disk array controller 114 (and therefore a storage peripheral 112) that is configured with one or more ports 122 (see FIG. 2) that are configured to respond to respective port IDs 128.

For example, port ID 0 (see col. 0, row. 0) is mapped to computers 102-1 and 102-2. This means that only host computers 102-1 and 102-2 have access to those LUs 116 (see FIG. 2) that are in turn mapped to port ID 0 by the corresponding disk array controller 114. Such a disk array controller port ID/LU mapping is discussed in greater detail below in reference to FIGS. 4 and 5. Additionally, port ID 1 (see col. 0, row 1) is mapped to host computer 102-3 (see col. 1, row 1), port ID 2 (see col. 0, row 2) is mapped to host computer 102-10 (see col. 1, row 2), and the like. (In this example, host computer 102-10 is one of the host computers 102 identified by host computer "102- . . . " in FIG. 1).

Switch SAN management procedure 124 maintains table 126. For example, if a disk array controller 114 that is attached to FC switch 108 modifies a corresponding port 122 to respond to different port IDs 128, Switch SAN management procedure 124 modifies table 126 to reflect the change. Such modifications include, for example, adding and/or removing port IDs 128. In one embodiment, this is accomplished by vendor unique commands sent over I/O interface 104 (see FIG. 1), or alternatively sent by a computer 102 over an out-of-band network connection using a Web browser. Such vendor unique commands can be provided using an protocol, for example, the SCSI protocol.

Additionally, if a host computer 102 is added or removed from SAN 100 (see FIG. 1), Switch SAN management procedure 124 modifies table 126 to respectively reflect the addition or removal of the computer through such vendor commands as described in greater detail above. In one embodiment, table 126 is created in FC switch 108 (see FIGS. 1 and 2) by sending FC switch 108 one or more vendor unique commands as described in greater detail above.

Figure 4:
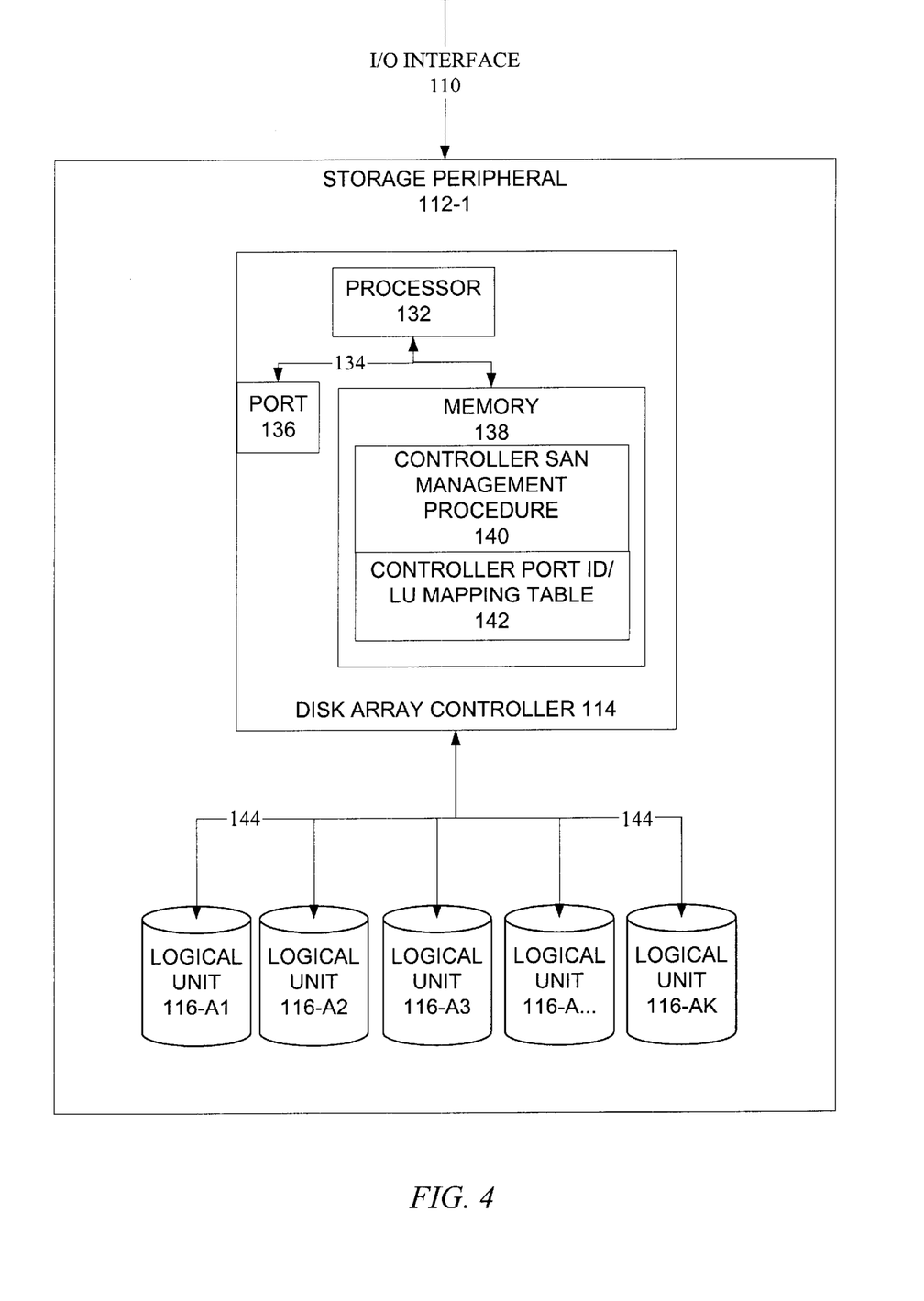
FIG. 4 is a block diagram that illustrates aspects of an exemplary storage peripheral, according to one embodiment of the present invention.

Referring to FIG. 4, there is shown a block diagram that illustrates aspects of an exemplary storage peripheral 112, according to one embodiment of the present invention. Storage peripheral 112 includes, for example, controller 114 which is connected across I/O interface 144 to a set of logical units 116. I/O interface 144 can be any type of I/O interface, for example a SCSI interface, as long as the I/O interface 144 has a set of signal lines that can be used by controller 114 to communicate with the set of logical units 116.

Controller 114 (controller 114) is connected across local I/O interface 134 to memory 138 and port 136. Local I/O interface 134 can be any type of I/O interface, for example a peripheral component interconnect (PCI) interface, as long as the local I/O interface 134 has a set of signal lines that can be used by processor 132 to transfer information between processor 132, port 136, and memory 138.

Port 136 provides a physical I/O connection or access point between I/O interface 110 and disk array controller 114. Port 136, for example, may be an on-module memory, an on-module interface, a peripheral device attached to controller 114, or some other mechanism, to/from which data is passed. A port in general is typically defined by a single fibre channel identifier, or port ID 128 (see FIG. 3) that is meaningful to I/O interface 110 logic. In contrast to the prior art, port 136 is configured such that it can have more than one such port ID 128, whereto a host computer 102 (see FIG. 1) can direct a set of messages to at least a subset of logical unit 116, Such messages are known in the art of computer programming, for example, SCSI messages and commands.

In one embodiment, port ID 128 is a SCSI target ID, which are known in the art of computer programming. In yet another embodiment, port ID 128 is another protocol's target ID, for example, a FC port 136 world wide name (WWN) port ID 128.

Memory 138 includes any combination of storage that is internal or external to processor 132 that is addressable by processor 132. For example, memory 138 can be cache memory, random access memory (RAM), non-volatile RAM, or external virtual memory on a data storage device, for example, in storage peripheral 112, where virtual addresses are mapped by processor 132 into real addresses. Processor 132 fetches and executes computer program instructions and data from memory 138. Such computer program instructions and data include, for example, controller SAN management procedure 140 and controller port ID/LU mapping table 142. Controller SAN management procedure 140 manages host computer 102 (see FIG. 1) access to LUs 116. To better understand the procedures of controller SAN management procedure 140, we first describe controller port ID/LU mapping table 142.

Figure 5:
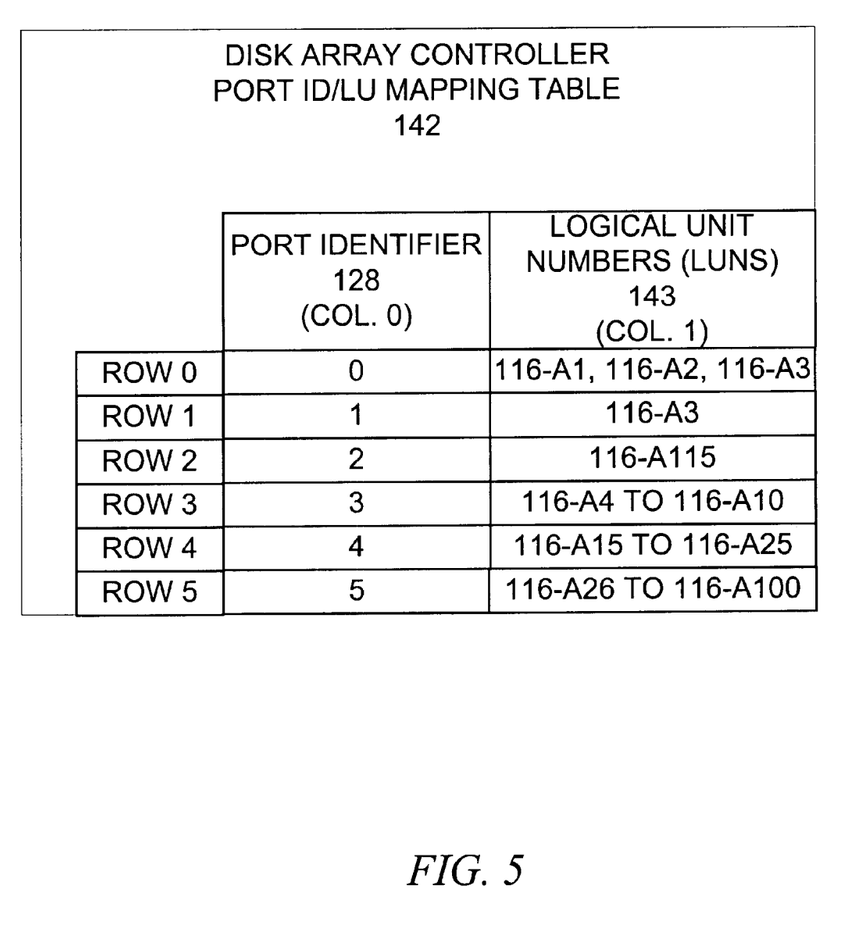
FIG. 5 is a block diagram that illustrates aspects of an exemplary disk array controller port ID/logical unit mapping table, according to one embodiment of the present invention.

Referring to FIG. 5, there is a block diagram that illustrates aspects of an exemplary disk array controller port ID/LU mapping table 140 (table 140), according to one embodiment of the present invention. Using table 142, a controller SAN management procedure 140 will only allow host computer 102 (see FIG. 1) access to a set of predetermined logical units 116 (see FIGS. 1 and 4) that are identified by one of the enumerated port IDs 128 in table 142. To illustrate an example of such mapping, consider that port ID zero (0) (see col. 0, row 0) is mapped to LUs 116-A1, 116-A2, and 116-A3 (see col. 1, row 0). This means that a computer 102 that sends a communication to disk array controller 114 that includes port ID 0 will only be able to access LUs 116-A1, 116-A2, and 116-A3.

Additionally, for example, port ID 1 (see col. 0, row 1) is mapped to LU 116-A3 (see col. 1, row 1). This means that a computer 102 that sends a communication to disk array controller 114 that includes port ID 1 will only be able to access LU 116-A3. Port ID 2 (see col. 0, row 2) is mapped to LU 116-A115 (see col. 1, row 2), and the like. (In this example, LU 116-A115 is one of the LUs 116 represented by "LU . . . ").

In one embodiment, controller SAN management procedure 140 creates table 140 by a computer 102 sending one or more vendor unique commands to a specified disk array controller 114 through fabric 106, or through an out-of-band network connection using a Web browser, for example, Microsoft Internet Explorer®). Such vendor unique commands can be provided using an protocol, for example, the SCSI protocol.

Controller SAN management procedure 140 maintains table 140. For example, if a LU 116 is added/removed from a storage peripheral 112 controlled by disk array controller 114, controller SAN management procedure 140 respectively adds/removes any corresponding LU 116 entry in table 142. Such adding and/or removing is accomplished through the used by a computer 102 of such vendor unique commands as discussed in greater detail above with respect to the creation of table 140.

Similarly, if a host computer 102 is added or removed to/from SAN 100 (see FIG. 1), if the host computer has access to the disk array controller 114, controller SAN management procedure 140 will respectively add/remove the host computer's 102 entry and corresponding LU 116 mappings from table 142. In one embodiment, this is accomplished by sending the disk array controller 114 corresponding vendor unique commands as described above.

Figure 6:
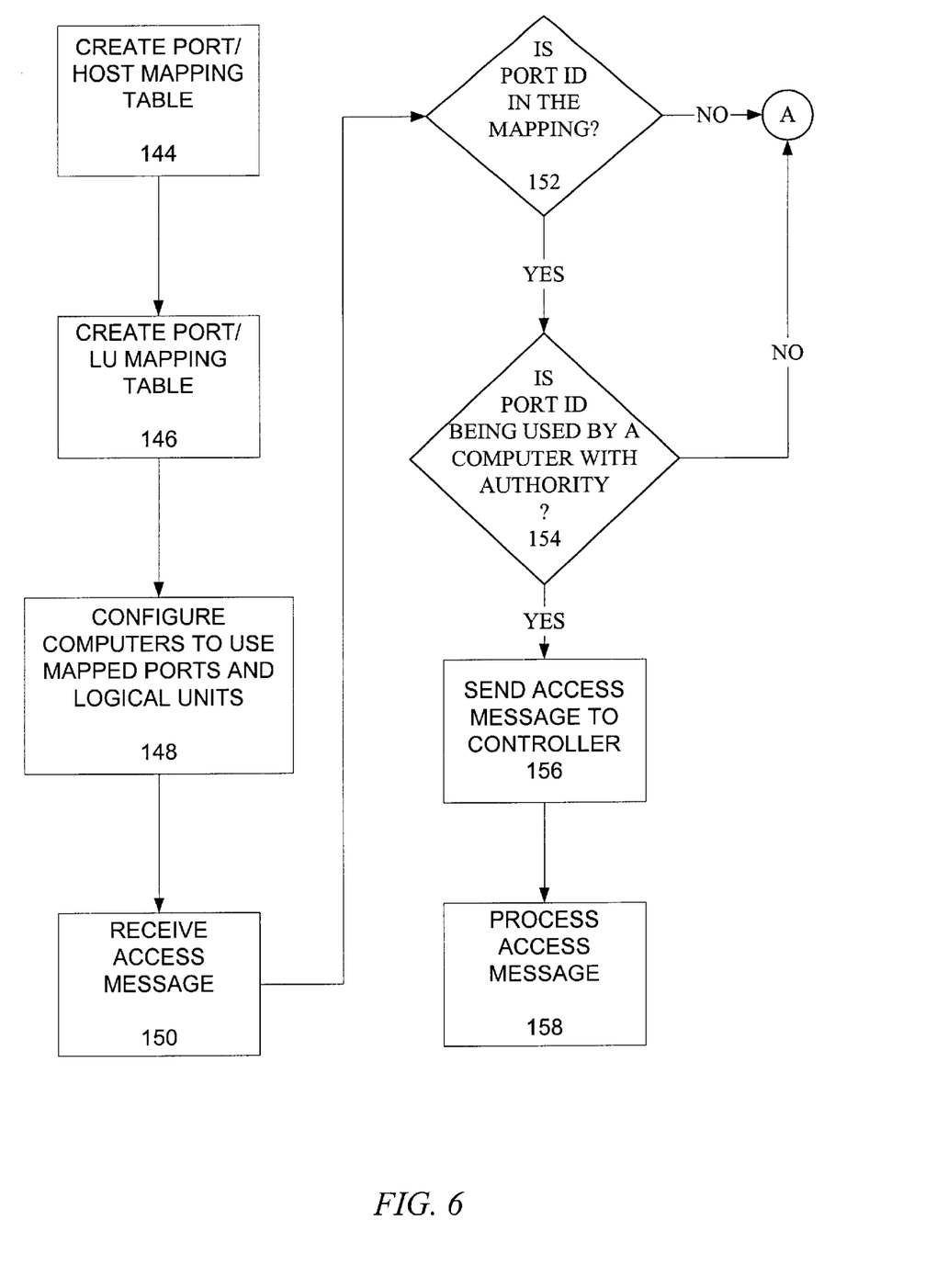
FIG. 6 is a block diagram that illustrates aspects of an exemplary procedure, according to one embodiment of the present invention; and, FIG. 7 is a block diagram that illustrates aspects of an exemplary procedure, according to one embodiment of the present invention.

Referring to FIG. 6, there is a flowchart that illustrates aspects of an exemplary procedure to manage access to storage peripherals and logical units, according to one embodiment of the invention. Step 144 creates a switch port ID/host computer mapping table 126 in FC switch 108 (See FIGS. 1 and 2) as described in greater detail above in reference to FIG. 3. Step 146 creates a disk array controller port ID/LU mapping table 142 in a disk array controller 113 (see FIGS. 1 and 4) as described in greater detail above in reference to FIG. 5.

Step 148 configures host computers 102 (see FIG. 1) to use the mapped port IDs 128 (see FIGS. 3 and 5) to access the mapped logical units 130 (see FIG. 5). In one embodiment, this is accomplished by using operating system supplied assignments of a respective host computer's 102 use of a port ID 128 in a command. Procedures for an operating system to provide such assignments are known in the art of computer programming.

Step 150 receives, by FC switch 108 (see FIGS. 1 and 2), an access message from a host computer 102. As discussed above, such access messages are known in the art of computer programming, for example, a SCSI read/write or a report LUNs command. Step 152 determines, by switch SAN management procedure 124 (see FIG. 2) if the received access message (step 150) includes a port ID 128 that is in the FC switch port ID/host computer mapping table 126 (see FIG. 3).

Figure 7:
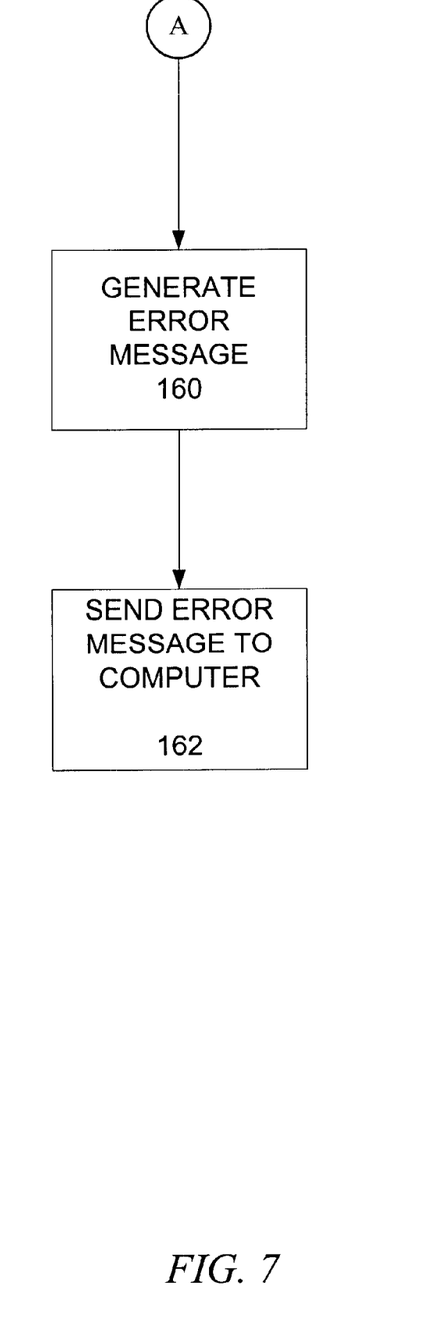

For example, if the access message include port ID 0, and the table 126 includes port ID 0, then the port ID is in the mapping table. If the port ID is not in the mapping table 126, the procedure continues at step 160 as illustrated in FIG. 7, which will be discussed in greater detail below. Otherwise, step 154 determines, by switch SAN management procedure 124, if the port ID 128 is being used by a computer 102 with proper authority. To accomplish this, switch SAN management procedure 124 checks to see if the message access sending computer 102 is enumerated in the port IDs 128 corresponding host computer(s) with access rights entry 130 (see FIG. 3). For example, if port ID 1 is included in the received access message (step 150), switch SAN management procedure 124 will determine if computer 102-3 sent the message. If not, the procedure continues at step 160 as illustrated in FIG. 7, which will be discussed in greater detail below.

Otherwise, step 156 sends, by switch SAN management procedure 124, the received access message (step 150) to the controller 114 identified by the message's port ID 128. This is accomplished using standard protocols that are known in the art of computer programming, for example, this is accomplished using the SCSI protocol.

Step 158 processes, by disk controller SAN management procedure 140 (see FIG. 4), the received access message from FC switch 108 (step 156). To accomplish this, disk controller SAN management procedure 140 first determines those LUNs 143 (see FIG. 5) that correspond to the port ID 128 in the message. For example, if the port ID is equal to zero (0), LUNs 116-A1, 116-A2 and 116-A3 are to be used to process the message. As noted above, the message can be, for example, a read/write request or a report LUNs request. The controller 114 will process the message using the identified LUs 116 (identified by their respective LUNs 143) according to procedures that are known in the art of computer programming.

Referring to FIG. 7, there is a flowchart that illustrates aspects of an exemplary procedure to control host computer 102 access to storage peripherals 112 and LUs 116 (see FIG. 1), according to one embodiment of the present invention. Step 160 generates an appropriate error message. For example, a host computer 102 may send a message to a peripheral 112 that includes an invalid port ID 128 (see FIG. 3, and step 152 in FIG. 6). Or, a host computer 102 may send a message to a peripheral 112 that includes a valid port ID 128, but yet includes an port ID 128 that is not mapped to the sending computer 102 (see FIG. 3). In either case, switch SAN management procedure 124 (see FIG. 2) will generate a corresponding message to inform the sending computer 102 of the error. Step 162 sends the generated error message (step 160) to the access message sending host computer 102 according to procedures which are known in the art of computer programming.

It can be appreciated that the invention provides many benefits as compared to prior art techniques for SAN management. For example, the system, apparatus and procedure of the present invention is more effective than prior art non-distributed SAN management efforts because of the recognized need for higher data throughput in SAN management component without requiring enhanced processing capabilities of such components that typically increase the associated costs of such components.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

All publications and patent applications mentioned in this specification are herein incorporated by reference to the same extent as if each individual publication or patent application was specifically and individually indicated to be incorporated by reference.

We claim:

1. A method to control access by at least one computer system to at least one uniquely identifiable logical storage unit that is associated with a storage unit controller within a storage area network, each said computer system uniquely identifiable with a computer system ID, the method comprising:

(a) establishing an association between at least one corresponding computer system ID and at least one port ID to identify a subset of the at least one computer system having access to the storage unit controller identifiable by the port ID;

(b) establishing an association between a controller port ID, selected from said at least one port ID, and the at least one uniquely identifiable logical storage unit to identify a subset of the at least one uniquely identifiable logical storage unit that is accessible using said controller port ID;

(c) receiving a first request from a first computer system selected from the at least one computer system to access the uniquely identifiable logical storage unit; and (d) determining from associations established at (a) and (b) whether said first request shall be granted.

2. The method of claim 1, wherein said determining at (d) further comprises:

(i) determining access to the storage controller is based on the association established at (a), wherein the storage unit controller is identifiable by a selected port ID, from said at least one port ID, that corresponds with said first computer system; and (ii) determining access to the uniquely identifiable logical storage unit is based on the association established at (b), wherein the uniquely identifiable logical unit is identifiable by a selected logical storage unit, from said at least one uniquely identifiable logical storage unit, that corresponds with said selected port ID.

3. The method of claim 2, wherein said determining at (i) is coupled with a fiber channel switch, and said determining at (ii) is coupled with the storage unit controller that is accessible using a plurality of controller port IDs including said controller port ID.

4. The method of claim 3, wherein each port ID is tabulated at (b) to identify access to a subset of said at least one uniquely identifiable logical storage unit. coupled with the storage unit controller.

5. The method of claim 1, wherein the storage controller is identifiable by a plurality of port IDs selected from said at least one port ID.

6. The method of claim 1, wherein said first request is selected from a group of requests consisting of: a SCSI message request, a SCSI command request, a read request, a write request, and a combination thereof.

7. The method of claim 1, wherein a first port ID, selected from said at least one port ID at (a), is associated with a plurality of said computer system IDs selected from said at least one corresponding computer system ID.

8. The method of claim 1, wherein (b) precedes (a).

9. The method of claim 1, wherein at least two of (a), (b), (c) and (d) are carried out by a controller external to said first computer system.

10. The method of claim 1, wherein said at least one computer system includes a plurality of computer systems.

11. The method of claim 1, further comprising:
(e) modifying the association at (a) in response to receiving a modification command.

12. The method of claim 1, further comprising:
(e) modifying the associations at (a) and (b) in response to receiving a modification command.

13. The method of claim 12, wherein the modification command is received from a second computer system selected from the at least one computer system.

14. The method of claim 1, wherein the establishing an association between at least one corresponding computer system ID and at least one port ID includes tabulating an association between at least one corresponding computer system ID and at least one port ID.

15. The method of claim 1, wherein the establishing an association between a controller port ID and the at least one uniquely identifiable logical storage unit includes tabulating an association between a controller port ID and the at least one uniquely identifiable logical storage unit.

16. A system to control access by at least one computer system to a uniquely identifiable logical storage unit, each said computer system uniquely identifiable with a computer system ID, the system comprising:
a storage structure including at least one memory;
a configuration manager, coupled to said storage structure, to configure a first memory selected from said at least one memory, said configuration including:
a first table including tabulation of an association between at least one corresponding computer system ID and at least one port ID to identify a subset of the at least one computer system having access to the storage unit controller identifiable by the port ID; and
a second table including tabulation of an association between a controller port ID, selected from said at least one port ID, and the at least one uniquely identifiable logical storage unit to identify a subset of the at least one uniquely identifiable logical storage unit that is accessible using said controller port ID;
a first table manager, coupled to said first table, to receive a first tabulation command to define at least a subset of said first tabulation;
a second table manager, coupled to said second table, to receive a second tabulation command to define at least a subset of said second tabulation;
a request manager for receiving a first request from a first computer system selected from the at least one computer system to access the uniquely identifiable logical storage unit;
an access manager for determining from associations of said first tabulation and said second tabulation whether said first request shall be granted; and
at least one processor, coupled with said configuration manager, said first tabulation manager, said second tabulation manager, said request manager, and said access manager to control access.

17. The system of claim 16, further comprising a switch and a controller, wherein the storage controller is identifiable by a plurality of port IDs selected from said at least one port ID.

18. The system of claim 17, wherein a first port ID, selected from said at least one port ID at (a), is associated with a plurality of said computer system IDs selected from said at least one corresponding computer system ID.

19. The system of claim 18, wherein the first tabulation precedes the second tabulation.

20. The system of claim 18, wherein at least two of the first table manager, second table manager, request manager, and access manager are carried out by a controller external to said first computer system.

21. A system to control access by at least one computer system to a uniquely identifiable logical storage unit, each said computer system uniquely identifiable with a computer system ID, the system comprising:
a switch couplable with the at least one computer system, said switch including a first table including an association between at least one port ID and at least one corresponding computer system ID to identify a subset of the at least one computer system having access to a storage unit controller identified by the port ID;
said storage unit controller coupled with a second table including an association between each said port ID and at least one uniquely identifiable logical storage unit that is accessible based on said port ID;
means for receiving a first request from a first computer system selected from the at least one computer system to access the uniquely identifiable logical storage unit; and
means for determining from associations of said first table and said second table whether said first request shall be granted.

22. The system of claim 21, wherein said first table and said second table are provided in a single lookup table.

23. The system of claim 21, wherein said means for receiving includes at least one of (a) a fiber optic communication, (b) a wireless communication, and (c) a hard wired communication.

24. A computer program product for use in conjunction with a computer system, the computer program product comprising a computer readable storage medium and a computer program mechanism embedded therein, the computer program mechanism, comprising: a program module to control access by at least one computer system to a uniquely identifiable logical storage unit that is associated with a storage unit controller within a storage area network, each said computer system uniquely identifiable with a computer system ID, the program module including instructions for:

(a) tabulating an association between at least one port ID and at least one corresponding computer system ID to identify a subset of the at least one computer system having access to the storage unit controller identified by the port ID;

(b) tabulating an association between each said port ID and at least one uniquely identifiable logical storage unit that is accessible based on said port ID;

(c) receiving a first request from a first computer system selected from the at least one computer system to access the uniquely identifiable logical storage unit;

(d) determining from associations tabulated at (a) and (b) whether said first request shall be granted; and a CPU coupled to said computer-readable medium, for executing said computer program code therein.

25. The computer program product of claim 24, wherein a first port ID, selected from said at least one port ID at (a), is associated with a plurality of said computer system IDs selected from said at least one corresponding computer system ID, and wherein said determining at (d) further comprises:

(i) determining access to the storage controller is based on the association tabulated at (a), wherein the storage unit controller is identifiable by a selected port ID from said at least one port ID that corresponds with said first computer system; and (ii) determining access to the uniquely identifiable logical storage unit is based on the association tabulated at (b), wherein the uniquely identifiable logical unit is identifiable by a selected logical unit from said at least one uniquely identifiable logical storage unit corresponding with the said selected port ID.

26. A computer program product for use in conjunction with a computer system, the computer program product comprising a computer readable storage medium and a computer program mechanism embedded therein, the computer program mechanism comprising:

a program module that directs computer system components to function in a specified manner including controlling access by at least one computer system to a uniquely identifiable logical storage unit with each computer system uniquely identifiable with a computer system ID, the program module including instructions for:

(a) tabulating an association between at least one port ID and at least one corresponding computer system ID to identify a subset of the at least one computer system having access to the storage unit controller identified by the port ID;

(b) tabulating an association between each said port ID and at least one uniquely identifiable logical storage unit that is accessible based on said port ID;

(c) receiving a first request from a first computer system selected from the at least one computer system to access the uniquely identifiable logical storage unit; and (d) determining from associations tabulated at (a) and (b) whether said first request shall be granted; and a CPU coupled to said computer-readable medium, for executing said computer program code therein.

27. A controller to control access to a first logical storage unit selected from a plurality of logical storage units using a request port ID selected from a plurality of port IDs, the controller system comprising:

a storage structure including at least one memory;

a configuration manager, coupled to said storage structure, to configure said first memory selected from said at least one memory, said configuration including a second tabulation to identify access by representing an association between at least two port IDs selected from the plurality of port IDs, wherein each of the at least two port IDs is associated with at least one logical storage unit selected from the plurality of logical storage units;

a second tabulation manager, coupled to said second tabulation, to receive a second tabulation command to define at least a subset of said second tabulation;

a request manager for receiving a first request identifying the request port ID, to access the first logical storage unit;

an access manager for determining from said second tabulation if said first request shall be granted; and at least one processor, coupled with said storage structure, said configuration manager, said second tabulation manager, said request manager, and said access manager to control access.

28. The controller of claim 27, wherein the first request is granted if said second tabulation includes an association between a first port ID corresponding to the request port ID, and said at least one logical storage unit corresponding to the first logical storage unit.

* * * * *